United States Patent Office 3,318,849
Patented May 9, 1967

3,318,849
LINEAR SYNTHETIC POLYMERIC FIBER
Walter W. Moseley, Jr., and Robert G. Parrish, Wilmington, Del., assignors to E. I. du Pont de Nemours and Company, Wilmington, Del., a corporation of Delaware
No Drawing. Original application Mar. 28, 1961, Ser. No. 98,777. Divided and this application Mar. 10, 1965, Ser. No. 438,779
4 Claims. (Cl. 260—77.5)

This application is a divisional of U.S. application Ser. No. 98,777, filed Mar. 28, 1961, and now abandoned, which is a continuation-in-part of U.S. application Ser. No. 717,826, filed Feb. 27, 1958, and now abandoned.

The present invention relates to high tenacity, high modulus shaped articles prepared from oriented, linear, fully synthetic alternating copolyurea polymers. In particular, it relates to copolyurea polymers having a tenacity of at least 9 grams per denier and an initial modulus of at least 180 grams per denier.

In recent years, the use of glass in the preparation of fibers has achieved increased prominence. Glass fibers have been selected for many uses because of their high tenacity, i.e., in the range from about 6.3 to 6.9 grams per denier, high modulus, in the range of 300 grams per denier, and good thermal stability. However, such fibers are not suitable for many uses, e.g., as textile materials, because of their relatively high density and brittleness. It is, of course, well known that the flex-life of glass fibers is extremely poor.

Attempts have been made to produce fully synthetic fibers which have a density lower than that of glass and a high flex-life. However, such attempts have not proved to be entirely successful because the low density and high flex-life have been achieved only by sacrificing one or more of the desirable properties such as tenacity, modulus or thermal stability.

Surprisingly, it has now been found that, by a proper selection of a fully synthetic polymeric material and a simple treatment of the fibers prepared from such material, fibers having a combination of all of the aforementioned desirable properties can be prepared. These fibers not only have a modulus in the range of the glass fibers but also have a higher tenacity, an excellent flex-life and a relatively low density.

It is, therefore, an object of the present invention to provide shaped articles of fully synthetic polymers having a high initial modulus combined with a high tenacity, excellent flex-life and a low density. A further object is to provide a process for preparing these particular shaped articles. Other objects will be apparent from the following detailed description.

The objects of this invention are achieved by providing a process for preparing a linear, fully synthetic shaped structure having a molecular orientation of at least 60%, a tenacity of at least 9 grams per denier and an initial modulus of at least 180 grams per denier which comprises forming a shaped structure of polymeric material of the formula

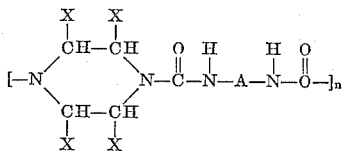

wherein X is a radical selected from the group consisting of hydrogen, methyl and ethyl, A is a divalent organic ring-containing radical wherein the nitrogen is preferably attached directly to an atom of a ring and n is an integer large enough to provide a polymer having an inherent viscosity of at least about 0.5, said polymeric material having a glass transition temperature $T_g$ of at least 180° C. and an initial sonic modulus $E_u$ of at least 50 grams per denier, extruding said polymeric material through an orifice and drawing said shaped structure while in a substantially amorphous plastic state at a temperature above the glass transition temperature and below the melting temperature of said polymeric material at a draw ratio between about 1.8× to about 4.5×.

For the purpose of the present invention, the above parameters $E_u$ and $T_g$ are defined as follows: $E_u$ is the sonic modulus expressed in grams per denier for the completely unoriented polymer and equals 11.3 times $c^2$, in which $c$ is the velocity of sound in the polymer measured in km./sec. at 26° C. and 30% to 70% relative humidity. For the present polymers, $c$ is measured on a shaped article of the pure, unoriented polymer at a frequency of 10 kc. in 60 c.p.s. pulses. $T_g$ is taken from plots of $E_u$ versus $T$, usually as the principal inflection point just below the temperature of crystallization. The values obtained for $T_g$ when measured as indicated above substantially agree with non-acoustic measurements if due consideration is given to the difference in observational time scale of the various determination methods.

The polymers suitable for the practice of this invention include linear, orientable fully synthetic alternating copolyurea polymeric material having recurring units comprised of alkyl-substituted piperazine radicals and ring-containing groups connected in alternation by amide linkages, and further characterized by a glass transition temperature $T_g$ of at least 180° C. and an initial sonic modulus $E_u$ of at least 50 grams per denier. Only those polymers of the class described above having the indicated structure which provides strong interchain forces and which permits the fulfillment of the requirements of a $T_g$ of at least 180° C. and an $E_u$ of at least 50 grams per denier, are suitable for the present invention.

In practicing the present invention, a suitable polymeric material is readily selected from the class of polyureas of the structure indicated above and having a glass transition temperature $T_g$ of at least 180° C., and an initial sonic modulus $E_u$ of at least 50 grams per denier. The polymer may be formed into shaped structures by known processes. Drawing may then be accomplished using conventional apparatus, however, drawing must be accomplished at a temperature at which the orientation rate substantially exceeds the rate of crystallization, i.e., drawing must take place while the polymer is in a substantially amorphous plastic state. This temperature will be in the range between the glass transition temperature $T_g$ and the melting temperature of the polymeric material. Obviously, the temperature selected must be one at which orientation of the polymer can be effected and, therefore, in the case of those polymers which tend to decompose before melting, the temperature must be below the decomposition temperature.

The preferred drawing temperature for a particular material can be readily determined by observing the percent molecular orientation of the material drawn at different temperatures. The amount of orientation introduced by drawing the shaped structure will, of course, vary with the specific polymeric material; however, it has generally been found necessary to have a molecular orientation of at least about 60% to 70% in order to obtain the product of this invention.

The invention will be further illustrated but is not intended to be limited by the following examples. In the examples, the tenacities and moduli recited are measured using an Instron tensile tester with a 1-inch gage length and a rate of 10% elongation per minute. The resulting data is based on 3 to 20 single filament breaks to obtain average properties at a relative humidity of 65% and a temperature of 70° F. The flex-fatigue life of the samples is determined by passing twenty-one fibers over a 3-mil diameter steel wire, securing one end of each fiber to a clamp which can be rotated 180° about the major axis of the wire, and attaching a weight equal to 0.6 gram per denier to each of the fibers. A cycle is completed each time the clamp is rotated 180° thereby unwrapping the fibers from the wire and assuming a position at which the fibers hang freely suspended from the clamp. Another cycle is completed as the clamp is rotated 180° in the opposite direction, rewrapping the fibers about the wire. The total number of cycles at the time eleven of the twenty-one fibers break is the flex-fatigue life.

The flex abrasion of the fibers is determined by securing a sheet of fibers having a total denier of 3500 in a frame under a tension of four pounds. The fibers are passed back and forth over a sapphire edge until complete failure of the fibers occurs. The total number of cycles recorded in the examples represents the average number of cycles before failure for five samples.

*Example I*

Two hundred and twenty-two (222) grams of biphenylene-4,4'-diisocyanate are dissolved in 1000 cc. of dimethylformamide at 70° C. and placed in a large Waring Blendor. With vigorous stirring, a solution of 112.2 grams of 2,5-dimethylpiperazine in 1000 cc. of dimethylformamide at 70° C. is added. Polymerization proceeds rapidly to give a clear, straw-colored gel; the temperature rises to about 90° C. Stirring is continued for five minutes. The gelled solution is held at 50° to 100° C. for some time in order to thermally degrade the polymer to the molecular weight at which it forms a clear, gel-free solution (an inherent viscosity in dimethylformamide of 2.48 in this particular case). The solution is centrifuged to remove bubbles and transferred to a spinning reservoir held at 60° C.

The solution is extruded through a 20-hole spinneret of 0.005-inch hole diameter at 122° C. The head temperature is 120° C., the adaptor is at 120° C., and the delivery rate is 8.76 cc./min. at a pressure of 205 p.s.i. The incoming air temperature is 195° C. with column temperatures of 190° C. at the top and 250° C. at the bottom. The yarn is withdrawn with a spin stretch factor of 4.0 and has a uniform cross-section of an elongated dog-bone shape. The as-spun properties are listed in Table 1.

TABLE 1

| Property: | As-spun |
|---|---|
| Inherent viscosity in dimethylformamide | 2.13 |
| Tenacity _____ g.p.d__ | 2.7 |
| Elongation _____ percent__ | 36 |
| Initial modulus _____ g.p.d__ | 52 |
| Work recovery at 3% _____ percent__ | 48 |
| Tensile recovery at 5% _____ do____ | 71 |
| Sonic modulus $E_u$ _____ g.p.d__ | 72 |
| Glass transition temperature $T_g$ _____ ° C__ | 250 |

The above unoriented filament is drawn 1.80× at 285° C. over a plate. The properties of the drawn filament are listed in Table 2.

TABLE 2

| Tenacity _____ g.p.d__ | 9.9 |
|---|---|
| Elongation _____ percent__ | 5.2 |
| Initial modulus _____ g.p.d__ | 291 |
| Molecular orientation [1] _____ percent__ | 81 |

[1] The molecular orientation was measured acoustically as $$M_0 = 100\left(1 - \frac{E_u}{E}\right)$$

The same polymerization process in its general form can be followed with minor modifications of concentrations of the intermediates. In this way, polymers of lower or higher inherent viscosity are obtained. In similar experiments the procedure of Example I is followed, using the same solvent but with either higher or lower concentrations of intermediates. The resulting polyureas are obtained with inherent viscosities ranging from 3.1–0.55 measured in dimethylformamide. Fibers are prepared from these polymers in the manner already described. The inherent viscosities measured on the as-spun fibers range from 2.8 to 0.50. All of the fibers have excellent as-spun properties. As would be expected, the physical properties of the higher molecular weight polymers have higher work recovery and, when drawn, have higher tenacities than the materials of lower inherent viscosity.

*Example II*

The fiber sample of Example I is drawn in the following manner by processes varying from the above example:

(a) The filament is drawn 2.28× through a 14-inch long air bath at 325° C. at an input speed of 10 ft./min.

(b) The filament is drawn 2.28× through a 14-inch long air bath at 325° C. at an input speed of 70 ft./min.

(c) The filament is drawn 2.5× through a 14-inch long air bath at 308° C. with an input speed of 30 ft./min.

(d) The filament is drawn 2.7× over a curvilinear temperature profile plate of 20 inches length at an input speed of 30 ft./min. and a maximum plate temperature of 320° C.

The properties are given in Table 3.

TABLE 3

| | Tenacity, g.p.d. | Elongation, percent | Initial Modulus, g.p.d. |
|---|---|---|---|
| (a) | 9.4 | 4.8 | 278 |
| (b) | 9.5 | 6.3 | 243 |
| (c) | 10.8 | 5.2 | 300 |
| (d) | 12.0 | 5.5 | 308 |

*Example III*

This example illustrates the influence of drawing temperature on the final fiber properties. A filament, prepared according to Example I, with initial properties of 1.9 g.p.d. tenacity, 35% elongation, and an initial modulus of 48 g.p.d., is drawn at various temperatures, with otherwise equal conditions. These conditions are: input speed 30 ft./min., length of plate 20 inches, draw ratio 2.6×. A curvilinear temperature profile for the plate is used. The properties are given in Table 4.

TABLE 4

| Maximum Plate Temp., ° C. | Tenacity, g.p.d. | Elongation, percent | Initial Modulus, g.p.d. | Molecular Orientation, percent |
|---|---|---|---|---|
| 295 | 7.8 | 4.2 | 256 | 90 |
| 305 | 7.6 | 4.0 | 274 | 84 |
| 325 | 8.1 | 4.2 | 253 | 93 |
| 335 | 10.0 | 5.0 | 262 | 90 |

*Example IV*

The above experiment is repeated with the same constant factors, but with an as-spun filament of 2.5 g.p.d. tenacity, 36% elongation, and 49 g.p.d. initial modulus. The results are shown in Table 5.

TABLE 5

| Maximum Plate Temp., ° C. | Tenacity, g.p.d. | Elongation, percent | Initial Modulus, g.p.d. | Molecular Orientation, percent |
|---|---|---|---|---|
| 295 | 9.6 | 5.3 | 242 | 88 |
| 305 | 10.4 | 5.2 | 279 | 82 |
| 315 | 10.2 | 5.2 | 271 | 85 |
| 325 | 8.9 | 4.4 | 277 | 90 |
| 335 | 9.3 | 3.5 | 265 | 83 |

Drawing at various relative room humidities, of course, shows no different results, since at these drawing temperatures any associated water is lost by vaporization and is ineffective in plasticizing the polymer.

The filaments prepared according to this example prove to be stable to boil-off and aging as well as to intense electron irradiation. They have good short-term thermal stability, good dimensional stability even under load at elevated temperature, good hot-wet properties, and satisfactory recovery properties. The transverse properties are low when compared to the straight properties, but at a satisfactory level when compared to other synthetic filaments and at a surprisingly high level when compared to glass.

When the flex-fatigue life and flex abrasion of the above filaments are compared to glass (the only material similar in tensile behavior), the values are surprisingly high. The filaments exhibit, also unlike glass, good moisture regain values, comparable to those from silk and cotton.

The physical properties after boil-off of the sample shown in Table 5 drawn over a plate having a maximum temperature of 305° C. are summarized in Table 6.

TABLE 6

| | |
|---|---|
| Tenacity at 21° C. g.p.d. | 10.4 |
| Elongation at 21° C. | 5.2 |
| Initial modulus at 21° C. g.p.d. | 279 |
| Molecular orientation percent | 82 |
| Wet tenacity at 21° C. g.p.d. | 6.8 |
| Wet elongation at 21° C. percent | 3.9 |
| Wet initial modulus at 21° C. g.p.d. | 265 |
| Tenacity at 90° C., wet g.p.d. | 4.1 |
| Elongation at 90° C., wet percent | 3.2 |
| Initial modulus at 90° C., wet g.p.d. | 163 |
| Work recovery at 3% elongation percent | 48 |
| Tensile recovery at 3% elongation do | 76 |
| Flex-fatigue life cycles | 3081 |
| Flex abrasion do | 50 |

After exposing the filaments 48 hours to 118° C., the tenacity is found to be reduced by only 10%, the elongation by 6%, whereas the initial modulus increases slightly.

*Example V*

9.07 grams of 2,5-dimethylpiperazine is dissolved in 270 ml. dimethylacetamide containing 5 grams/100 cc. of lithium chloride. This solution is rapidly stirred in an Osterizer and a solution of 21.37 grams of 3,3'-dimethyl-4,4'-diisocyanato-diphenylene in 65 cc. dimethylacetamide containing 5 grams/100 cc. of lithium chloride is added. Two minutes after the reaction has started, 0.46 gram 2,5-dimethylpiperazine in 15 cc. of the above solvent is added with stirring to react with any excess isocyanate. The solution rapidly becomes very viscous. It contains about 8% solids and may be directly spun. A small portion of the solution is separated, the solids precipitated by the addition of water, and the polymer dried and redissolved in concentrated sulfuric acid to determine the inherent viscosity. The inherent viscosity of this polymer is 2.56.

The solution is placed in a dry-spinning apparatus in a reservoir heated to 52° C. The spinneret has 10 holes of 5 mils diameter. A yarn is extruded with a pump pressure of 250 p.s.i. The temperature of the spinneret is 85° C. The incoming air temperature is 215° C., and the temperature of the column in all positions is 200° C. The yarn is wound up at a speed of 108 yards per minute with a spin stretch factor of 2.1. Under these conditions, the yarn retains enough solvent so that no finish has to be applied to it. However, it is subsequently extracted four days in cold water to remove the dimethylacetamide and lithium chloride.

This yarn, which has a tenacity of 1.9 g.p.d., an elongation of 48%, an initial modulus of 59 g.p.d., a $T_g$ of 205° C., and an initial sonic modulus of 84 g.p.d., is drawn on a 12-inch long hot plate. The plate has a maximum temperature of 351° C. near the center of the plate, and temperatures of 289° C. at the front end and 297° C. at the rear end of the plate. With an input speed of 30 ft./min. and a windup speed of 78 ft./min., a draw ratio of 2.6× is attained. The yarn thus developed has a sonic modulus (this is the modulus of the oriented sample) of 551 g.p.d. The tenacity is 12.1 g.p.d., the elongation 3.3%, and the initial tensile modulus 415 g.p.d.

*Example VI*

A yarn sample prepared according to Example V is drawn 3.3× at 350° C. temperature over a hot pin. This yarn exhibits, after this drawing, the following properties:

TABLE 8

| | |
|---|---|
| Sonic modulus g.p.d. | 469 |
| Tenacity g.p.d. | 11.5 |
| Elongation percent | 3.7 |
| Initial modulus g.p.d. | 401 |

*Example VII*

This example demonstrates the superiority of the newly developed filament in utility. A filament, made according to Example I, with a tenacity of 2.4 g.p.d., an elongation of 10%, and an initial modulus of 85 g.p.d. (A), is compared with a filament in which a tenacity of 9 g.p.d., an elongation of 5%, and an initial modulus of 280 g.p.d. (B) have been developed. The filaments are cut into ½-inch fibers, made into waterleaves, and used as reinforcing structures in the making of polyester resin sheets. The properties of these compositions are listed in Table 9.

TABLE 9

| Property | A | B |
|---|---|---|
| Fiber reinforcement, percent by weight | 40 | 40 |
| Tensile strength, $10^4$ p.s.i. | 0.98 | 1.8 |
| Tensile modulus, $10^4$ p.s.i. | 69 | 110 |
| Flexural strength, $10^4$ p.s.i. | 1.4 | 2.3 |
| Flexural modulus, $10^4$ p.s.i. | 45 | 80 |

Table 9 demonstrates the outstanding improvements achieved by developing the high properties for reinforcement purposes. It is apparent from this table that tensile strength and modulus, as well as flexural strength and modulus, have almost doubled for the same fiber percentages. The reinforced structures (B) are in line with the properties achieved by reinforcing the polyester with glass fibers, which, however, exhibit poor weld-line strength.

The following examples illustrate the criticality of the limits for $T_g$ and $E_u$ of the synthetic polymers of which the products of this invention are comprised.

*Example VIII*

A linear polyamide is prepared from 2,5-dimethylpiperazine and terephthaloyl chloride by adding to a Waring Blendor at room temperature 10.6 grams (0.1 mole) of sodium carbonate, 1.05 cc. of water, 45 cc. of a 13.7% aqueous 2,5-dimethylpiperazine solution (0.055 mole), and 50 cc. of methylene chloride. The mixture is stirred rapidly and 10.15 grams (0.05 mole) of terephthaloyl chloride dissolved in 50 cc. of methylene chloride is added. The reaction mixture is poured into a beaker, and the methylene chloride is evaporated from the mixture by using a steam bath. The polymer is then isolated, washed, and dried. The yield is 12 grams, and the inherent viscosity in meta-cresol (as 0.5% solution) is 1.53. The sticking temperature of the polymer is above 400° C., and the glass transition temperature $T_g$ is 292° C. The polymer is dissolved in technical grade formic acid and dry spun from a 16% solids-containing solution into strong fibers having an $E_u$ of 27 g.p.d.

The highest draw ratio for the above fiber is obtained at a pin temperature of 450° C. The polymer can be drawn 4.4× and the best physical properties attained are: tenacity 7.7 g.p.d., elongation 8%, initial modulus 150 g.p.d. Since the instant polymer does not follow the minimum requirements of $E_u$, it will be noted that the high level of tenacity and initial modulus cannot be obtained, although $T_g$ fulfills the above requirement.

The following table contains a listing of some of the well-known commercial polymers as well as other polymeric compositions which further illustrate the criticality of the values for $T_g$ and $E_u$ in producing the products of this invention. Using the process of this invention, structures having a tenacity of at least 9 grams per denier and and initial modulus of at least 180 grams per denier cannot be obtained from the polymers listed in the table.

TABLE 10

| Polymer | $E_u$, g.p.d. | $T_g$, °C. |
|---|---|---|
| Natural rubber | 1-2 | -73 |
| 6-Nylon | 18 | 40 |
| 66-Nylon | 21 | 50 |
| Polyacrylonitrile | 25 | 73 |
| Polyamide from 2,5-dimethylpiperazine and terephthalic acid | 27 | 292 |
| Polyamide from bis(4-aminocyclohexyl) methane and terephthalic acid | 30 | 220 |
| Polyamide from 2,5-dimethylpiperazine and adipic acid | 36 | 90 |
| Polyamide from piperazine and hexahydroterephthalic acid | 41 | >300 |
| Poly(ethylene terephthalate) | 24 | 68 |

Table 11 which follows lists a few of the polymers within the scope of this invention.

TABLE 11

| Polymer from— | $E_u$, g.p.d. | $T_g$, °C. |
|---|---|---|
| Tetramethylpiperazine and 3,3'-dimethyl-4,4'-diisocyanatobiphenylene | 60 | 190 |
| 2,5-dimethylpiperazine and 3,3'-dimethyl-4,4'-diisocyanatobiphenylene | 84 | 205 |
| 2,5-dimethylpiperazine and phenylene-1,3-diisocyanate | 50 | 206 |

The above table points out the striking contrast of the sonic moduli of the unoriented polymers and their glass transition temperatures when compared with the polymers listed in Table 10. These polymers and a great number of similar copolyureas with stiff polymer chains fall within the definition of the present invention by having a glass transition temperature above 180° C. and an $E_u$ above 50 grams per denier.

The foregoing examples illustrate the practice of this invention but, as previously stated, are not intended to be limitative since any variation in materials and processing conditions given herein may be substituted directly for those used in the examples.

In the examples, the term "curvilinear temperature profile" has been used. This term refers to a nonuniform temperature profile along the plate over which the filament is drawn.

In the foregoing examples, it has been demonstrated that a very high tenacity and initial modulus combination can be developed in a fiber made from an alternating cyclic copolyurea with a glass transition temperature $T_g$ together with the sonic modulus $E_u$ providing a measure for selecting the polymer. The process for developing these outstanding properties has also been demonstrated. In general, these fibers have a density below about 1.3 grams per cubic centimeter as compared with about 2.5 grams per cubic centimeter for glass.

It will be obvious to those skilled in the art that the drawing conditions vary within certain limits depending on the polymer. However, as has been previously stated, the drawing temperature used must be within the limits of the range defined by the glass transition temperature and the melting temperature of the polymeric material. Furthermore, the drawing must be accomplishesd before crystallization of the polymer occurs.

It can be seen from the examples that the maximum draw ratios attained in producing the fibers of this invention are relatively low, varying with the polymer being drawn. A draw ratio sufficiently high to give full orientation is selected.

Drawing may be accomplished by passing the fiber over or near to a heated pin, heated roller, heated plate and the like. Since finite times are required for the orientation and crystallization processes, the varying residence times of the fiber in the heated drawing zone of a pin or a plate can seriously affect the fiber properties, e.g., any incremental drawing which might occur beyond the draw point might be lost in pin-drawing because the time spent at an elevated temperature under drawing tension is short. Plate-drawn fibers remain under drawing tension at the drawing temperature for a much greater time.

In a preferred embodiment of the process of this invention, the fiber is drawn over a plate having a curvilinear temperature profile with a suitable peak temperature. As previously stated, drawing must be accomplished before crystallization of the polymer occurs. Using a curvilinear temperature profile, the fiber gradually approaches the maximum temperature permitting orientation of the molecular chains before appreciable crystallization occurs. However, it should be noted that crystallinity is not a critical feature of the products of this invention since polymeric materials which do not crystallize fall within the parameters $E_u$ and $T_g$ previously set forth.

From the foregoing discussion, it is obvious why plate-drawing may be preferred for developing maximum physical properties. However, pin-drawing can give excellent results where only a short residence time of the fiber at a certain optimum drawing temperature is required (see Example VI). However, the advantages of the curvilinear temperature profile can be attained in pin-drawing by using a plurality of pins heated individually to give a similar temperature profile throughout the drawing range. Hot-air drawing will also produce very good final properties in a fiber, but achieving a particular temperature profile with hot air requires more complicated heating equipment.

The critical properties of the polymers which permit the production of shaped structures having the ultimate tenacity and stiffness of the product of this invention have been clearly stated in the foregoing discussion. In addition to those polymers already listed, other suitable polymers having these properties are described in Katz U.S. application Ser. No. 674,042, filed July 25, 1957, now U.S. Patent 2,975,157. Other polyureas may also be selected in which the recurring units consist of cyclic groups connected by amide linkages which give stiff-chain polymers having strong interchain forces. The cyclic groups may be carbocyclic or heterocyclic.

The fibers and films of the present invention are not only suitable for most applications in which glass fibers have heretofore been the only suitable and available materials, but they may also be used in applications where a lower density fiber and a fiber having a higher flex-life are required. The new fibers are useful in reinforcing plastics, particularly where the light weight of the objects is of importance. Another important use is in body armor where strength and stiffness as well as the impact strength are necessary. Among the many other uses, the new filaments are useful in the form of mats, needled bats, knitted or woven fabrics, waterleaves, and coated ropes. In general, the new fibers may be used in applications where high strength, high resistance to deformation, and good stability under load are required.

Throughout the specification and claims, any reference to parts, proportions and percentages refers to parts, proportions and percentages by weight unless otherwise specified.

It will be apparent that many widely different embodiments of this invention may be made without departing from the spirit and scope thereof and, therefore, it is not intended to be limited except as indicated in the appended claims.

What is claimed is:
1. A linear fully synthetic polymeric fiber structure having a molecular orientation of at least 60%, a tenacity of at least 9 g. per denier and an initial modulus of at least 180 g. per denier, and prepared by extruding a polymer having a repeating unit of the formula

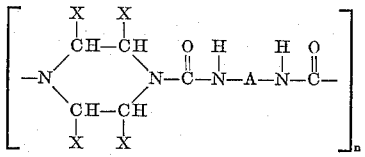

wherein X is a radical selected from the group consisting of hydrogen, methyl and ethyl, A is a divalent organic ring-containing radical wherein the nitrogen is attached directly to an atom of a ring and $n$ is an integer large enough to provide a polymer having an inherent viscosity of at least 0.5, through an orifice thereby forming a fiber structure and drawing said fiber structure while in a substantially amorphous plastic state at a temperature above the glass transition temperature and below the melting temperature of said polymeric material at a draw ratio between about 1.8× to about 4.5×.

2. The product of claim 1 in which said diisocyanate is 3,3'-dimethyl-4,4'-diisocyanatodiphenylene.

3. The product of claim 1 in which said polyurea is comprised of 2,5-dimethylpiperazine and a diisocyanate.

4. The product of claim 3 in which said diisocyanate is biphenylene-4,4'-diisocyanate.

References Cited by the Examiner
UNITED STATES PATENTS

| | | | |
|---|---|---|---|
| 2,708,617 | 5/1955 | Magat et al. | 260—77.5 |
| 2,731,445 | 1/1956 | Wittbecker | 260—47 |
| 2,731,446 | 1/1956 | Wittbecker | 260—77.5 |
| 2,813,775 | 11/1957 | Steuber | 260—77.5 |
| 2,820,024 | 1/1958 | Meine van der Kerk et al. 260—77.5 |
| 2,913,433 | 11/1959 | Wittbecker | 260—47 |
| 2,975,157 | 3/1961 | Katz | 260—77.5 |
| 3,130,179 | 4/1964 | Cotter | 260—77.5 |
| 3,131,167 | 4/1964 | Cotter | 260—77.5 |

LEON J. BERCOVITZ, *Primary Examiner.*

DONALD E. CZAJA, F. McKELVEY, M. C. JACOBS,
*Assistant Examiners.*